United States Patent [19]

Lautrette et al.

[11] 4,338,193
[45] Jul. 6, 1982

[54] HORIZONTAL ENDLESS BELT VACUUM FILTER

[75] Inventors: Jean-Claude Lautrette, St. Crepin-Ibouviller; Christian A. Queyroix, Maisons Laffitte, both of France

[73] Assignee: F. Aoustin et Cie, Darnetal, France

[21] Appl. No.: 209,013

[22] Filed: Nov. 21, 1980

[30] Foreign Application Priority Data

Nov. 29, 1979 [FR] France ................................ 79 29383

[51] Int. Cl.³ ............................................. B01D 33/04
[52] U.S. Cl. ............................... 210/401; 210/DIG. 3
[58] Field of Search .................. 210/400, 401, DIG. 3

[56] References Cited

U.S. PATENT DOCUMENTS 2,377,252  5/1945  Lehrecke ............................ 210/401
4,154,686  5/1979  Ootani et al. .................... 210/401 X
4,265,765  5/1981  Gallottini ............................ 210/401

Primary Examiner—John Adee

Attorney, Agent, or Firm—McAulay, Fields, Fisher, Goldstein & Nissen

[57] ABSTRACT

An horizontal endless belt vacuum filter comprises an endless conveyor belt having a grooved bottom pierced with orifices for the liquid to flow and a table for supporting the upper side of this conveyor belt. This belt comprises, in its central part, a longitudinal vacuum box of which the upper inlet orifice is located beneath the orifices pierced in the belt and is defined between two substantially horizontal lateral flanges. On either side of the vacuum box are provided horizontal longitudinal elements. Plastic guide strips are mounted on the upper flanges of the vacuum box and of the longitudinal elements of the support table.

The guide strips are simply fitted on the upper flanges of the vacuum box and of the longitudinal elements, and maintained by simple friction and abutment, without any additional fixing means.

The guide strips on which the conveyor belt slides are advantageously snapped on the edges of the flange.

11 Claims, 4 Drawing Figures

HORIZONTAL ENDLESS BELT VACUUM FILTER

The present invention relates to improvements in horizontal endless belt vacuum filters.

Endless belt filters are already known which essentially comprise an endless rubber conveyor belt disposed horizontally on two drums and forming on its upper side a channel due to the presence of lateral beads. The bottom of this belt is provided with grooves allowing liquid to flow towards orifices made in the central part of the belt. Additionally, an endless filtering belt, longer than the conveyor belt, is placed on the latter and rests on the grooved bottom of the conveyor belt. It is detached therefrom beyond the driving drum to facilitate unloading of the cake. Beneath the upper side of the conveyor belt is a vacuum box or chamber extending longitudinally and constituting the central part of a table for supporting this side, which forms part of the assembly of the filter frame. This vacuum box, open at the top, communicates with a certain number of cells. It is divided into compartments by fixed or mobile internal partitions and is provided with an evacuation pipe so as to recover the filtrates from each zone.

The table supporting the upper side of the conveyor belt is constituted, in addition to the vacuum box forming its central part, by horizontal longitudinal elements disposed on either side of this vacuum box. The conveyor belt slides on these longitudinal elements and on substantially horizontal lateral flanges bordering the upper inlet orifice of the vacuum box via various elements constituted by guide strips made of plastics material, such as polyethylene, or endless wear belts. More particularly in the central part where the conveyor belt is applied under high pressure against the two upper lateral flanges of the vacuum box, this conveyor belt abuts on belts, themselves sliding on guide strips made of plastics material, fixed to the two flanges. In the lateral parts of the supporting table, where the pressure with which the conveyor belt is applied on the longitudinal elements is lower, this belt slides directly in contact with plastic guide strips fixed to the upper flanges of the longitudinal elements.

In the heretofore known endless belt filters, of the type mentioned above, the guide strips on which the conveyor belt slides are fixed by means of screws screwed in the upper flanges of the longitudinal elements and of the vacuum box and the heads of which are countersunk in the plastic guide strips themselves.

Such a mode of fixation presents several drawbacks. Firstly, as the guide strips wear out and must be changed after a certain period of functioning, for example every three months, the fixing screws must be unscrewed each time the guide strips are changed and replaced by new ones, this constituting a particularly long and inconvenient operation. In the central part of the filter, the vacuum box must previously be disengaged downwardly in order to have access to the guide strips fixed to these upper flanges. The operation of disconnecting the guide strips is all the more difficult to carry out as access to the guide strips is difficult and the whole of the filter is generally very dirty.

Another drawback of this mode of fixation is that, from a certain degree of wear of the guide strips, the heads of the fixing screws which, at the beginning, are countersunk in the plastic material, may project with respect to the top of the guide strip and may attack the conveyor belt itself.

It is an object of the present invention to overcome these drawbacks by providing a particularly simple means for mounting the guide strips, enabling them to be easily and rapidly changed after they have worn out.

To this end, the horizontal endless belt vacuum filter, of the invention comprises an endless conveyor belt having a grooved bottom pierced with orifices for the liquid to flow, a table for supporting the upper side of this conveyor belt, having in its central part, a longitudinal vacuum box whose upper inlet orifice is located beneath the orifices pierced in the belt and is defined between two substantially horizontal lateral flanges, and, on either side of the vacuum box, horizontal longitudinal elements, and plastic guide strips mounted on the upper flanges of the vacuum box and of the longitudinal elements of the support table, wherein the guide strips are simply fitted on the upper flanges of the vacuum box and of the longitudinal elements, and maintained by simple friction and abutment, without any additional fixing means.

According to a further feature of the invention, the guide strips on which the conveyor belt slides are advantageously snapped on. This mode of assembly is particularly appropriate for fixing the guide strips which border the orifice of the vacuum box and which tend to tilt under the effect of the depression.

The guide strips which are fitted on the upper flanges of the vacuum box are advantageously of H-cross section, whilst the cross section of those fitted on the flanges of the longitudinal elements of the support table is in the form of an upturned U. The device according to the invention offers the advantage that, when a guide strip wears out, no projecting member such as a screw can attack the conveyor belt, since the latter then slides on the flat surface of the upper flange on which the guide strip was fixed.

To take up the longitudinal stresses exerted on the guide strips and due to friction, the guide strips abut (every 3 meters for example) on a block not projecting beyond the level of the upper flange of the vacuum box or of the longitudinal element.

Advantageously, assembly and dismantling of the guide strips are considerably simplified. For assembly, it suffices to place each guide strip in position on the flange constituting its support and to force fit it, for example, by striking with a wooden mallet. It is also very simple to dismantle since it suffices to engage a tool such as a screwdriver between the guide strip and the upper flange supporting it.

The guide strips mounted on the upper flanges of the vacuum box also ensure protection against abrasion, by the solid particles taken along by the vacuum, of the edges of this vacuum box defining its inlet orifice. In fact, at this spot, the guide strips are provided with lips which extend slightly inwardly of the vacuum box, covering these edges.

By providing wear belts which slide on the top of the guide strips fixed to the upper flanges of the vacuum box, the housing of each belt formed in the guide strip tends to wear in dissymmetrical manner due to the force of friction produced by suction. When this dissymmetrical wear has reached a certain extent, it is very easy, due to the assembly means, according to the invention, to dismantle each guide strip and to dispose it in opposite direction from the preceding direction, so as to compensate wear.

The particularly simple means for mounting the guide strips enables the time required for changing the guide strips to be considerably reduced. Thus, in the case of a filter with a useful surface of 80 m², i.e. having a length of active filtering belt of 20 m and a width of 4 m, two people must at present each work 10 hours to dismantle and remount all the guide strips, to change a guide strip 20 m long using the prior known assembly means with countersunk screws. In comparison, with the means according to the invention for fixing by fitting, two people only need three hours. In other words, the total time required for changing the guide strips is only a third this operation being virtually the only maintenance operation to be performed on a belt filter.

The invention will be more readily understood from the following description with reference to the accompanying drawings, in which.

Figure 1:
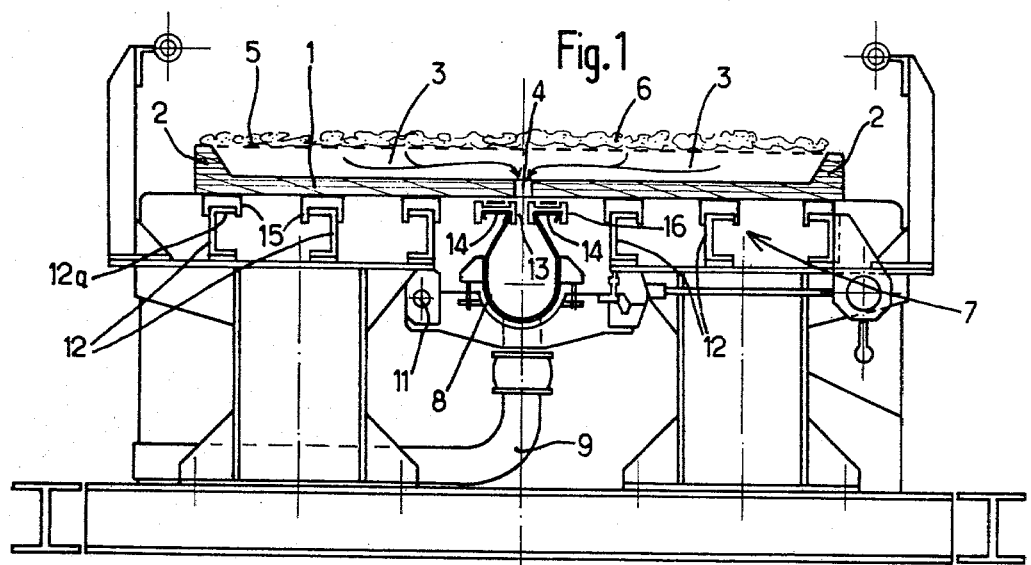
FIG. 1 is a view in transverse, vertical section of the top of a horizontal endless belt vacuum filter, according to the invention.

Referring now to the drawings, the endless belt filter which is shown in transverse section in FIG. 1 comprises an endless conveyor belt 1 made of rubber which is disposed horizontally on two drums driven in rotation. This belt forms a channel on its upper side due to the presence of lateral beads 2. The bottom of this belt is provided with transverse grooves 3 allowing the liquid to flow towards orifices 4 which are pierced in the bottom of the belt 1 and which are aligned in the axis thereof. Above the conveyor belt 1 there extends a horizontal endless filtering belt 5 which rest on the grooved bottom of the conveyor belt 1. The pulp 6 which is to be filtered is poured onto this filtering belt 5. Said belt is detached from the conveyor belt 2, beyond the driving drum (not shown), in order to facilitate unloading of the cake formed on this filtering belt 5.

The upper side of the conveyor belt 1 is supported by a support table 7 of which the central part is constituted by a vacuum box 8. This vacuum box 8 extends longitudinally beneath the conveyor belt 1, in the axis thereof. It is divided into compartments by fixed or mobile internal partitions and it is provided with evacuation pipes 9 connected to a vacuum source so as to recover filtrates from each zone. This vacuum box 8 is mounted to move on the frame of the machine. It may for example be mounted to pivot about a longitudinal shaft 11 so as to be able to be lowered by rotation about this axis 11.

The support table further comprises, on either side of the central vacuum box 8, a plurality of horizontal longitudinal elements 12 which are for example in U-section. The webs of these longitudinal elements 12 are vertical and terminate in horizontal flanges 12a serving as supports for the conveyor belt 1. In the central part, the vacuum box 8 is provided, on either side of its inlet orifice 13, with two substantially horizontal upper flanges 14 which extend outwardly.

To facilitate the slide of the conveyor belt 1 on the support table 7, wear guide strips 15 and 16 are provided. These guide strips which are made of plastics material, for example polyethylene, are machined so that their cross section enables them to be fitted on their support.

Figure 4:
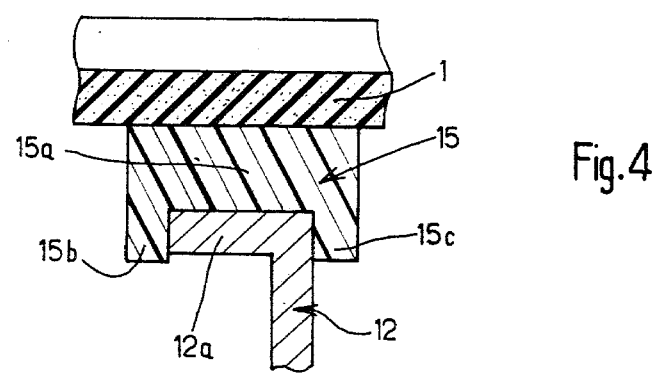
FIG. 4 is a view in transverse section, on a larger scale, of a guide strip mounted on a longitudinal element of the support table.

The guide strips 15 which are borne by the longitudinal elements 12 of the support table, have a cross section in the form of an inverted U. Each of these guide strips comprises, as may be seen more readily in FIG. 4, a horizontal web 15a which is applied on the upper flange 12a of the section 12, and two slide lips 15b and 15c which extend from web 15a downwardly. The distance between the two lips 15b, 15c is chosen to be equal to the width of the upper flange 12a, so that the guide strip 15 fits on this flange and is maintained thereon solely by friction, without having to employ an additional fixing means such as screws. The guide strips 16 are applied to the upper flanges 14 of the vacuum box, as may be seen more readily in FIG. 2. This figure shows that the flanges 14 are made, like the rest of the vacuum box 8, of sectioned sheet metal. The cross section of the guide strips 16 is substantially in H-shaped and they are provided, along their edges, with two parallel ribs 16a projecting upwardly and defining therebetween a housing for a wear belt 17 on which the conveyor belt 1 abuts. These wear belts are endless belts which are taken along by simple contact with the conveyor belt 1. The wear belts 17 thus slide on the upper face of the guide strips 16.

Additionally guide strips 16 are provided, along their edges, with two other lips 16b, 16c which extend downwardly and which enclose the corresponding upper flange 14 of the vacuum box 8. Each of these flanges 16b, 16c advantageously has an inwardly projecting bead 16d so as to enable the guide strip 16 to snap on the flange 14. This snap-on arrangement enables each guide strip 16 to withstand the considerable forces which are applied thereto under the effect of the depression prevailing in the vacuum box 8.

Figure 2:
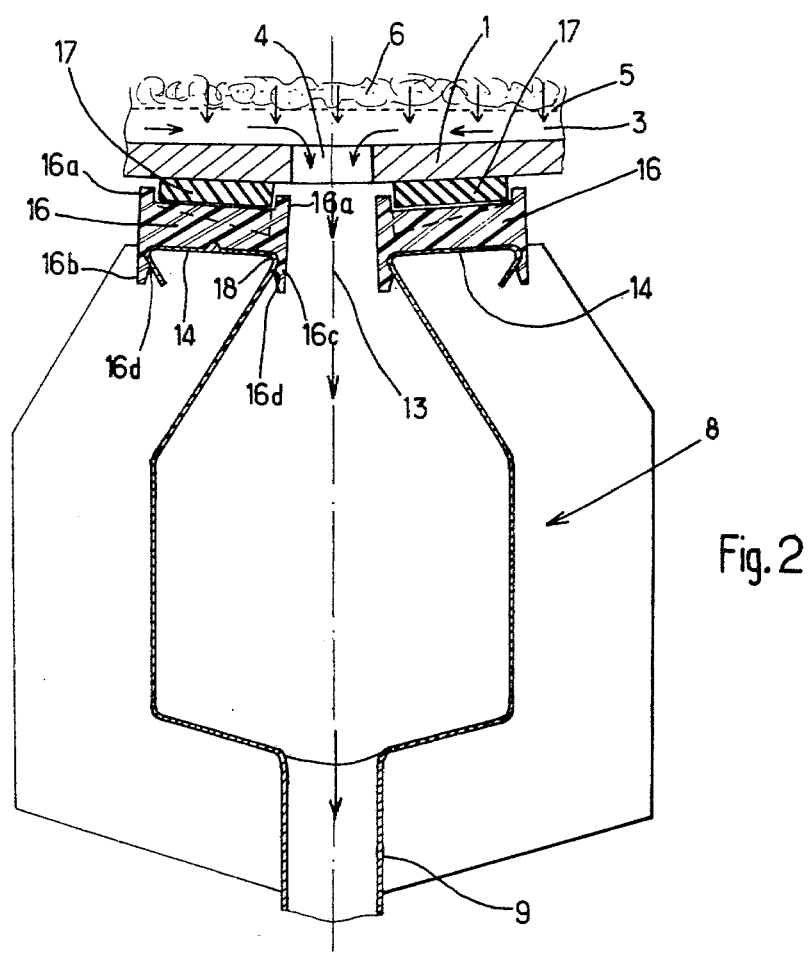
FIG. 2 is a view in transverse section, on a larger scale, of the central part of the support table where the vacuum box is located.

FIG. 2 shows that each lip 16b, 16c of a guide strip engaged slightly in the vacuum box 8, at the inlet orifice 13 thereof, also serves to protect against abrasion the longitudinal edge 18 of the dihedron which is formed by the upper flange 14 of the vacuum box 8 and the wall of this vacuum box of which the width increases downwardly at its inlet. As the wear belts 17 are urged, by suction from vacuum box 8, in the direction of the inlet orifice 13, the top of the guide strip 16 does not wear out regularly but, after a certain time, the bottom of the housing in which each wear belt 17 slides tends to be hollowed out nearer the inlet orifice 13 than outside. The wear section which is thus produced is indicated in dashed and dotted lines in FIG. 2. The means for mounting the guide strips 16 according to the invention enables this state of wear to be very easily remedied, since it suffices, after having tilted the vacuum box 8 downwardly, about its axis 11, to dismantle each guide strip 16 and reassemble it in opposite direction so that the more hollowed outpart faces towards the outside. In the course of functioning of the filter, each wear belt 17 will then hollow out the inner zone of its housing more, so as to arrive at a virtually flat bottom. The guide strips 16 may thus be used again and again until they wear out completely.

From the foregoing, it is seen that it is very easy to assemble the guide strips 15 and 16 on their edges: it simply suffices to force fit them, using a mallet, for example. It is also very easy to dismantle them since it suffices to engage a tool such as screwdriver between the guide strips and the flanges 12a and 14.

Figure 3:
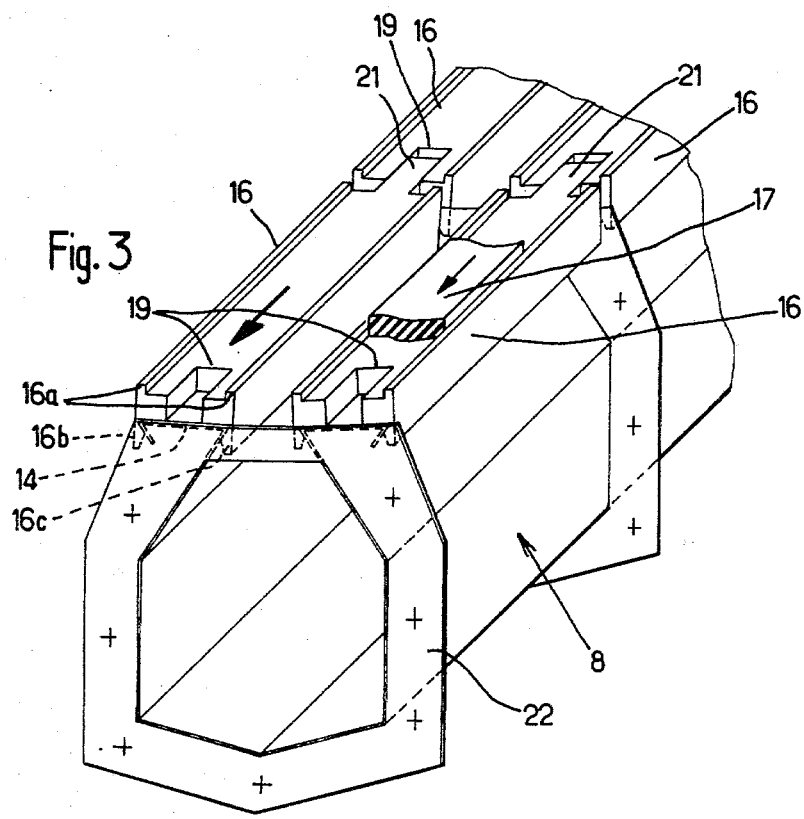
FIG. 3 is a partial perspective view of the vacuum box.

FIG. 3 shows that the guide strips 16 are in fact constituted by a plurality of longitudinally aligned sections. Each of these sections is provided, at its downstream end, with respect to the direction of displacement of the belts 17, with a notch 19 opening in its front face and, at its upstream end, a tenon 21 which partially engages in the notch 19 of the adjacent guide strip 16. Furthermore, the vacuum box 8 is constituted by prismatic sections which are terminated at their ends by transverse assembly flanges 22. The top of each of these flanges 22 forms a stop for the two guide strips 16 located upstream. The contact between the guide strips 16 and the transverse flange 22 is made by the lower lips 16b, 16c only, the remaining part of the cross section of the guide strip being located above the upper edge of the flange 22. The guide strips 16 are applied against the flange 22 located downstream, under the effect of the friction of the wear belts 17 driven downstream. The expansion of the guide strips 7 due to the heating caused by friction is absorbed by the tenons 21 which may engage more or less in the notches 19.

Although in the embodiment of the invention which has been described hereinabove, the lower part of guide strips 15 and 16 are of female section in which a corresponding male section 12a, 14, provided in the upper part of their support, engages, the opposite arrangement may also be envisaged, i.e. in which the supports of the guide strips, i.e the longitudinal elements 12 and the vacuum box 8, would have a female cross section cooperating with a male section provided in the lower part of the guide strips.

The guide strips 16 which are fixed to the top of the vacuum box 8 are preferably snapped on, as has been described, in order to avoid their falling when the vacuum box 8 pivots for a change of belts, guide strips or for cleaning purposes. However, if the vacuum box can be disengaged downwardly by lowering it parallel to itself, by a movement of translation, the guide strips fixed to the top of this vacuum box could simply be fitted and not snapped on, as in the case of the guide strips 15 provided on the longitudinal elements 12.

These longitudinal elements 12 are provided, for the sections of guide strip 15, with blocks not projecting beyond the level of the upper flange 12a of the longitudinal element 12 and serving as stop for the sections of guide strip 15 borne by this flange, these blocks thus performing the same role of stop as the flanges 22.

What is claimed is:

1. A vaccum filter comprising a driven continuous conveyor belt having openings therein allowing liquid flow therethrough;
   a continuous filtering belt above said conveyor belt;
   a table supporting said conveyor belt;
   a vacuum chamber forming part of said table;
   said chamber having an inlet in its upper part below said openings and upper flanges extending outwardly from both sides of said inlet;
   said table including also horizontal longitudinal supports on each side of said chamber;
   said supports terminating at their upper ends in horizontal flanges; and
   plastic guide strips for said conveyor belt frictionally engaged with said upper flanges of said chamber and with said flanges of said longitudinal supports in abutting contact therewith.

2. The filter of claim 1, wherein said guide strips are snapped over the edges of said flanges of said chamber and of said supports.

3. The filter of claim 1, wherein said strips include spaced longitudinal downwardly projecting lips for enclosing therebetween the top of a flange and fitting over the edges thereof.

4. The filter of claim 1, wherein said flanges of said chamber have a curved outer longitudinal edge and said guide strips thereon have a downwardly projecting lip with an inwardly protruding bead fitting around said edge.

5. The filter of claim 1, wherein said strips on said flanges of said chamber have upstanding parallel, longitudinal lips along their edges defining a housing therebetween; and,
   in said housing, a wear belt longitudinally slidable in said housing and supporting said conveyor belt.

6. The filter of claim 5, wherein said chamber comprises a plurality of sections and transverse assembly flanges around its ends;
   one of said flanges being located downstream relative to the direction of travel of said conveyor belt;
   said one flange forming a stop for restraining said guide strips on said chamber against the urging of said wear belt moving downstream.

7. The filter of claim 6, wherein said strips comprise a plurality of sections;
   each section having at one end thereof a notch and at its other end a tenon for engaging a complementary notch at the end of an adjacent strip.

8. The filter of claim 1, wherein each of said longitudinal elements carries blocks;
   said blocks not projecting beyond the level of said flanges thereof and serving as stops for said strips on said flanges.

9. The filter of claim 1, wherein said strips are formed of polyethylene.

10. The filter of claim 1, wherein said chamber is pivotally mounted on said table.

11. The filter of claim 1, wherein said strips have a flat upper surface.

* * * * *